US 7,320,451 B2

(12) United States Patent
Ogawa

(10) Patent No.: US 7,320,451 B2
(45) Date of Patent: Jan. 22, 2008

(54) STAND FOR LIQUID CRYSTAL TELEVISION AND STAND FOR LIQUID CRYSTAL DISPLAY

(75) Inventor: Masuo Ogawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 145 days.

(21) Appl. No.: 10/862,196

(22) Filed: Jun. 4, 2004

(65) Prior Publication Data

US 2005/0001114 A1    Jan. 6, 2005

(30) Foreign Application Priority Data

Jun. 6, 2003  (JP)  ............... P2003-161523
Jun. 12, 2003  (JP)  ............... P2003-167376

(51) Int. Cl.
*F16M 11/00* (2006.01)

(52) U.S. Cl. ............ 248/161; 248/127; 248/157; 248/166; 248/125.1; 248/125.8; 248/176.1; 248/176.3; 361/681; 361/683; 361/825; 348/825

(58) Field of Classification Search ........ 248/127, 248/917, 919, 922, 923, 161, 157, 166, 371, 248/398, 125.1, 125.8, 454–456, 473, 372, 248/393, 176.1, 176.3, 175; 361/681, 683, 361/825; 348/825

See application file for complete search history.

(56) References Cited

U.S. PATENT DOCUMENTS 6,256,075 B1 *   7/2001  Yang ................. 348/843
6,570,627 B1 *   5/2003  Chang ................ 348/794
6,651,943 B2 *   11/2003 Cho et al. ............ 248/122.1
6,971,622 B2 *   12/2005 Ziegler et al. ........ 248/454
7,239,506 B2 *   7/2007  Ogawa et al. ........ 361/681
2003/0231460 A1 *   12/2003 Moscovitch ........... 361/681
2004/0118984 A1 *   6/2004  Kim et al. ........... 248/149

FOREIGN PATENT DOCUMENTS

JP          4-36382        3/1992
JP          3065530      * 10/1999

* cited by examiner

*Primary Examiner*—Carl D. Friedman
*Assistant Examiner*—Todd M. Epps
(74) *Attorney, Agent, or Firm*—Osha Liang LLP

(57) ABSTRACT

In a stand of liquid crystal display, a holding member may include a slider, a lower cover, a leaf spring that abuts against a side of the slider, a push-force adjusting member. The push-force adjusting member includes a push member, which has a tapered portion and pushes the leaf spring, and a screw member, which adjusts a height of the tapered portion of the push member relative to the leaf spring. The push-force adjusting member serves to adjust a push force of the leaf spring on the side of the slider. The lower cover has an adjustment hole, through which the screw member can be adjusted from outside. The slider may have a rectangular-shaped. The lower cover may have a first stopper, against which an upper end surface of the slider abuts, and a second stopper, against which a lower end surface of the slider abuts.

10 Claims, 15 Drawing Sheets

STAND FOR LIQUID CRYSTAL TELEVISION AND STAND FOR LIQUID CRYSTAL DISPLAY

BACKGROUND OF THE INVENTION

1. Field of the Invention

The present invention relates to a stand for liquid crystal display including a television, and more relates to a stand for the liquid crystal display provided with a stand member that supports the liquid crystal display in an inclined state at a predetermined angle.

2. Description of the Related Art

Conventionally, a stand that supports an article such as liquid crystal televisions is known (for example, see JP-UM-A-4-36382 and Japanese Utility Model Registration NO. 3065530).

JP-UM-A-4-36382 discloses a construction, in which an elevation angle adjusting stand is pivotally mounted on a back surface of a liquid crystal display. Also, Japanese Utility Model Registration No. 3065530 discloses a stand that stands an article and includes a gear portion turnably mounted on a body, a slide gear that meshes with the gear portion and is mounted slidably on the body, and a leg that supports the body on a surface, on which an article stands, whereby an inclination of the article can be adjusted in one pitch of the gear portion.

However, with a conventional stand 300 for liquid crystal televisions, disclosed in Patent Document 2 and shown in FIG. 24, since a distance between a position A, in which a liquid crystal television 350 rests, and a position (B or C), in which a stand 300 for liquid crystal televisions rests, is varied in order to change an inclination of the liquid crystal television 350, there is caused a problem that a further large installation space is necessary in order to rest the liquid crystal television 350 in a state of further inclination. Also, a stand provided with an angle adjustment mechanism disclosed in the above Patent Document 1 involves a similar problem.

Hereupon, in place of a mechanism that adjusts an inclination of the liquid crystal television 350 on the basis of an opening angle of the conventional stand member shown in FIG. 24, a mechanism is conceivable, which extends and contracts a stand member to thereby adjust an inclination of the liquid crystal television 350.

FIG. 25 is a schematic, side view showing an example of a stand for liquid crystal televisions, provided with an expansion mechanism for a stand member. Referring to FIG. 25, a stand 301 for liquid crystal televisions, provided with an expansion mechanism for a stand member includes a holding member 321 and a stand member 331. The holding member 321 is mounted to a back surface of a liquid crystal television 350 in a state, in which it is opened a predetermined angle, and the stand member 331 is mounted on the holding member 321 to be able to extend and contract. With the stand 301 for liquid crystal televisions, provided with an expansion mechanism for the stand member, an inclination of the liquid crystal television 350 can be adjusted by extending and contracting the stand member 331 of the stand 301 for liquid crystal televisions, relative to the holding member 321. In this case, a distance between a position A, in which the liquid crystal television 350 rests, and a position B in which the stand member 331 of the stand 301 for liquid crystal televisions rests, is maintained constant. Thereby, a distance between a position, in which the liquid crystal television 350 rests, and a position, in which the stand member 331 rests, can be decreased as compared with a stand 300 for liquid crystal televisions, provided with a conventional angle adjusting mechanism, so that it is thought that the installation space can be reduced correspondingly.

With the stand 301 for liquid crystal televisions, provided with the expansion mechanism for the stand member and shown in FIG. 25, however, the stand member 331 bears the dead weight of the liquid crystal television 350, so that the stand member 331 is held by that movement restricting force (push force), the order of which prevents the stand member from being extended or contracted by the dead weight of the liquid crystal television 350. In this case, the liquid crystal television 350 is increased in dead weight when it is increased in size in a state, in which the movement restricting force (push force) on the stand member 331 is made constant, so that there is a possible disadvantage that the stand member 331 is in some cases moved due to the dead weight of the liquid crystal television 350 in a direction, in which it contracts. Accordingly, with a construction, in which an inclination of the liquid crystal television 350 is adjusted by extending and contracting the stand member 331, it is believed difficult to use the stand 301 for liquid crystal televisions, in common for liquid crystal televisions 350 that are different in dead weight and have a plurality of sizes.

Recently, liquid crystal televisions have been developed as thin and compact televisions. Liquid crystal televisions are known, which are thin and compact and supported at a back surface thereof by a stand mounted on the back surface of a liquid crystal television. As such stand for liquid crystal televisions, it is conceivable to use a stand that stands an article provided with a conventional angle adjustment mechanism (for example, see Japanese Utility Model Registration No. 3065530).

Japanese Utility Model Registration No. 3065530 discloses a stand comprising a gear portion turnably mounted on a body, a slide gear that meshes with the gear portion and is mounted slidably on the body, and a leg that supports the body on a surface, on which an article stands, whereby an inclination of the article can be. adjusted in one pitch of the gear portion.

FIG. 25 is a schematic, side view showing a conventional stand provided with an angle adjustment mechanism disclosed in Japanese Utility Model Registration No. 3065530 when used as a stand for liquid crystal televisions.

In the case where the stand disclosed in Japanese Utility Model Registration No. 3065530 is used as a stand 300 for liquid crystal televisions as shown in FIG. 25, however, an inclination of an article can be adjusted only in several stages, so that it is possible to perform rough angular adjustment. Thereby, it is difficult to adjust the inclination to one, which is easiest for a user to see.

With the conventional stand 300 for liquid crystal televisions, shown in FIG. 25, since a distance between the position A, in which the liquid crystal television 350 rests, and the position (B or C), in which the stand 300 for liquid crystal televisions rests, is varied in order to change an inclination of the liquid crystal television 350. A further large installation space is necessary in order to rest the liquid crystal television 350 in a state of further inclination.

SUMMARY OF THE INVENTION

The invention has been thought of in order to solve the above problems.

It is an object of the invention to provide a stand for liquid crystal televisions and a stand for liquid crystal displays, by which an inclination of a liquid crystal television and a liquid crystal display can be adjusted to an optional angle in a predetermined angular range.

It is further object of the invention to provide a stand for liquid crystal televisions (a stand for liquid crystal displays), by which an inclination can be adjusted by extending and contracting a stand member and which can be used in common for liquid crystal televisions (liquid crystal displays) that are different in dead weight and have a plurality of sizes.

In order to attain the above objects, in a first aspect of the invention, there is provided with a stand for a liquid crystal display including: a pipe-shaped stand member mounting on a back surface of the liquid crystal display to support the liquid crystal display in an inclined state at a predetermined angle, the pipe-shaped stand member including; a support portion extending horizontally relative to a rest surface of the liquid crystal display; and two tip ends extending in a direction perpendicular to the rest surface; a base member mounted on the back surface of the liquid crystal display and rotatably mounting the holding member, a holding member, to which the two tip ends of the stand member are mounted, the holding member including; a rectangular-shaped slider mounted to the two tip ends of the pipe-shaped stand member, the rectangular-shaped slider having; a side surface having substantially flat side center portion extending in a first direction substantially in parallel to a second direction, in which the tip ends of the pipe-shaped stand member extend and both rounded side end recessed from the substantially flat side center portion of the side surface; and one end surface and the other end surface, which extend in a third direction substantially perpendicular to the second direction;

a slider bearing member movably supporting the rectangular-shaped slider in the first direction, the slider bearing member having; a first stopper, against which the one end surface of the rectangular-shaped slider abuts; and a second stopper, against which the other end surface of the rectangular-shaped slider abuts, and a movement restricting member for restricting movement of the rectangular-shaped slider caused at a force equal to or less than a predetermined moving force having; a convex-shaped leaf spring mounted on the slider bearing member and arranged to abut against the substantially flat side center portion of the rectangular-shaped slider; and a push member made of a rubber material and pushing the convex-shaped leaf spring against the substantially flat side center portion of the rectangular-shaped slider with a predetermined pushing force.

With the stand for liquid crystal display in the first aspect, by making the side center portion of the slider substantially flat and providing the movement restricting member that pushes the substantially flat side center portion with a predetermined push force and restricts movements of the slider caused at a force equal to or less than a predetermined moving force in the manner described above, the stand member mounted on the slider can be prevented from moving due to the dead weight of the liquid crystal television, and when an angle of the stand member is to be adjusted, the slider can be moved by application of a force equal to or larger than a predetermined moving force while a push force of the movement restricting member against the substantially flat side center portion of the slider is maintained constant. Also, by forming the side center portion of the slider to make the same substantially flat, the side center portion of the slider is made free of any step, so that the slider can be moved continuously in a stepless manner. Thereby, the stand member connected to the slider can be extended or contracted continuously in a stepless manner in a range, in which the substantially flat side center portion of the slider abuts against the movement restricting member. Thereby, a length of the stand member can be adjusted steplessly relative to the holding member in a range, in which the substantially flat side center portion of the slider abuts against the movement restricting member, so that an inclination of the liquid crystal television can be adjusted to an optional angle in a predetermined angular range. Also, an inclination of the liquid crystal television can be adjusted by extending and contracting the stand member, so that it is possible to adjust an inclination of the liquid crystal television without shifting a position of the liquid crystal television and a position of the support of the stand member relative to a rest surface. Thereby, a distance between a position, in which the liquid crystal television rests, and a position, in which the stand member rests, can be decreased as compared with the case where adjustment of an inclination of the liquid crystal television is performed by adjusting an opening angle of the stand member relative to the liquid crystal television, so that the installation space can be reduced correspondingly. Also, since an inclination of the liquid crystal television can be adjusted in a state, in which a position, in which the liquid crystal television rests, and a position, in which the stand member rests, are fixed, it is possible to reduce the possibility that the rest surface might be injured at the time of adjustment of an inclination of the liquid crystal television.

Also, in the first aspect, the slider is configured to include rounded side ends recessed from the substantially flat side center portions, whereby the tip end of the convex-shaped leaf spring can be fitted onto one of the side ends of the slider when the stand member is contracted to a maximum, and the tip end of the convex-shaped leaf spring can be fitted onto the other of the side ends of the slider when the stand member is extended to a maximum. Further, the slider bearing member is configured to include a first stopper, against which the one end surface of the slider abuts, and a second stopper, against which the other end surface of the slider abuts, whereby the first stopper bears the one end surface of the slider when the stand member is contracted to a maximum, and the second stopper bears the other end surface of the slider when the stand member is extended to a maximum. Thereby, when the stand member is contracted to a maximum and extended to a maximum, it is possible to fix the slider such that it is not easily moved. As a result, it is possible to prevent the stand member from coming off from the holding member when the stand member is contracted or extended.

Also, in the first aspect, by turnably mounting the holding member to the base member mounted on the back surface of the liquid crystal television, the stand member can be put in a state, in which the stand member is closed on a side of the back surface of the liquid crystal television, at the time of conveyance and transportation. Thereby, it is possible to decrease a storage space at the time of conveyance and transportation.

Also, in the first aspect, the movement restricting member is configured to include a convex-shaped leaf spring arranged to abut against the substantially flat side center portion of the slider, and a push member, which is made of a rubber material and pushes the convex-shaped leaf spring against the substantially flat side center portion of the slider with a predetermined push force, whereby it is possible to easyly push the substantially flat side center portion of the slider with a predetermined push force.

In a second aspect of the invention, there is provided with a stand for a liquid crystal display including: a stand member mounting on a back surface of the liquid crystal display to support the liquid crystal display in an inclined state at a predetermined angle, the stand member including a support portion and two tip ends; a holding member, to which the two tip ends of the stand member are mounted, the holding member including; a slider having a side surface having substantially flat side center portion and both side ends recessed from the flat side center portion; and a slider bearing member movably supporting the slider; and a movement restricting member mounted on the slider bearing member, for restricting movement of the slider caused at a force equal to or less than a predetermined moving force, and pushing against the flat side center portion of the slider with a predetermined pushing force.

With the stand for liquid crystal displays in the second aspect, by making the side center portion of the slider substantially flat and providing the movement restricting member that pushes the flat side center portion with a predetermined push force and restricts movements of the slider caused at a force equal to or less than a predetermined moving force in the manner described above, the stand member mounted on the slider can be prevented from moving due to the dead weight of the liquid crystal display, and when an angle of the stand member is to be adjusted, the slider can be moved by application of a force equal to or larger than a predetermined push force while a push force of the movement restricting member against the substantially flat side center portion of the slider is maintained constant. Also, by forming the side center portion of the slider to make the same substantially flat, the side center portion of the slider is made free of any step, so that the slider can be moved continuously in a stepless manner. Thereby, the stand member connected to the slider can be be extended or contracted continuously in a stepless manner in a range, in which the substantially flat side center portion of the slider abuts against the movement restricting member. Thereby, a length of the stand member can be adjusted steplessly relative to the holding member in a range, in which the substantially flat side center portion of the slider abuts against the movement restricting member, so that an inclination of the liquid crystal display can be adjusted to an optional angle in a predetermined angular range. Also, an inclination of the liquid crystal display can be adjusted by extending and contracting the stand member, so that it is possible to adjust an inclination of the liquid crystal display without shifting a position of the liquid crystal display and a position of the stand member relative to a rest surface. Thereby, a distance between a position, in which the liquid crystal display rests, and a position, in which the stand member rests, can be decreased as compared with the case where adjustment of an inclination of the liquid crystal display is performed by adjusting an opening angle of the stand member relative to the liquid crystal display, so that the installation space can be reduced correspondingly. Also, since an inclination of the liquid crystal display can be adjusted in a state, in which a position, in which the liquid crystal display rests, and a position, in which the stand member rests, are fixed, it is possible to reduce the possibility that the rest surface might be injured at the time of adjustment of an inclination of the liquid crystal display.

In the stand for liquid crystal displays in the second aspect, preferably, the slider includes one end surface and the other end surface, which extend in a direction substantially perpendicular to a direction, in which the tip ends of the stand member extend, and the slider bearing member movably holds the slider in the direction substantially in parallel to the direction, in which the tip ends of the stand member extend, and includes a first stopper, against which the one end surface of the slider abuts, and a second stopper, against which the other end surface of the slider abuts. With such configuration, the first stopper bears the one end surface of the slider when the stand member is contracted to a maximum, and the second stopper bears the other end surface of the slider when the stand member is extended to a maximum. Thereby, when the stand member is contracted to a maximum and extended to a maximum, it is possible to fix the slider such that it is not easily moved. As a result, it is possible to prevent the stand member from coming off from the holding member when the stand member is contracted or extended.

In the stand for liquid crystal displays in the second aspect, preferably, the holding member is turnably mounted to a base member, which is mounted on the back surface of the liquid crystal display. With such configuration, the stand member can be put in a state, in which it is closed on a side of the back surface of the liquid crystal television, at the time of conveyance and transportation, so that it is possible to decrease a storage space at the time of conveyance and transportation.

In the stand for liquid crystal displays in the second aspect, preferably, the movement restricting member is mounted on the slider bearing member and includes a convex-shaped leaf spring arranged to abut against the substantially flat side center portion of the slider, and a push member, which is made of a rubber material and pushes the convex-shaped leaf spring against the substantially flat side center portion of the slider with a predetermined push force. With such configuration, it is possible to easily push the substantially flat side center portion of the slider with a predetermined push force.

According to third aspect of the invention, there is provided with a stand for a liquid crystal display including: a pipe-shaped stand member mounting on a back surface of the liquid crystal display to support the liquid crystal display in an inclined state at a predetermined angle, the pipe-shaped stand member including; a support portion extending horizontally relative to a rest surface of the liquid crystal display; and two tip ends extending in a direction perpendicular to the rest surface; a base member mounted on the back surface of the liquid crystal display and rotatably mounting the holding member; a holding member, to which the two tip ends of the stand member are mounted, the holding member including; a slider mounted to the two tip ends of the pipe-shaped stand member; a slider bearing member movably supporting the rectangular-shaped slider in a direction substantially in parallel to a direction, in which the tip ends of the pipe-shaped stand member extend; a convex-shaped leaf spring mounted on the slider bearing member and arranged to abut a front surface of the convex-shaped leaf spring against a side surface of the rectangular-shaped slider; a push member pushing the convex-shaped leaf, and the push member including; a tapered portion which at least partially abuts against a back surface of the convex-shaped leaf spring; and a hole; a screw member fixedly inserted into the hole of the push member to move integrally with the push member, and adjusting a height of the tapered portion of the push member relative to the convex-shaped leaf spring; and a push-force adjusting member adjusting a push force of the convex-shaped leaf spring on the side surface of the rectangular-shaped slider, wherein the slider bearing member has an adjustment hole, through which the screw member can be adjusted from outside.

With the stand for liquid crystal display in the third aspect of the invention, the slider bearing member is provided with the convex-shaped leaf spring arranged in a manner to abut against the side of the slider, and the push-force adjusting member serving to push the abutment member against the side of the slider, whereby the slider can be inhibited from moving due to the dead weight of the liquid crystal television Thereby, the stand member mounted on the slider can be inhibited from moving due to the dead weight of the liquid crystal television, and when an angle of the stand member is to be adjusted, application of a force equal to or larger than a predetermined moving force makes it possible to move the slider against a push force of the convex-shaped leaf spring on the side of the slider. Thereby, an expandable length of the stand member can be adjusted relative to the holding member in a range, in which the side of the slider abuts against the convex-shaped leaf spring, so that an inclination of the liquid crystal television can be adjusted in a predetermined angular range. Also, an inclination of the liquid crystal television can be adjusted by extending and contracting the stand member, so that it is possible to adjust an inclination of the liquid crystal television without shifting a position of the liquid crystal television and a position of the support of the stand member relative to a rest surface. Thereby, a distance between a position, in which the liquid crystal television rests, and a position, in which the stand member rests, can be decreased as compared with the case where an inclination of the liquid crystal television is adjusted by adjusting an opening angle of the stand member relative to the liquid crystal television, so that the installation space can be reduced correspondingly. Also, a convex-shaped leaf spring constitutes an abutment member that abuts against the side of the slider, whereby the leaf spring has a smooth surface, and so the slider can be moved smoothly.

Also, in the third aspect, by providing the push-force adjusting member that adjusts a push force of the convex-shaped leaf spring on the side of the slider, the push-force adjusting member is used to enable appropriately adjusting a push force required for restricting movements of the stand member due to the dead weight of the liquid crystal television even in the case where a load on the stand member connected to the slider is varied attributable to different sizes of liquid crystal televisions. As a result, the stand for liquid crystal televisions can be used in common for liquid crystal televisions having a plurality of sizes. Also, the push-force adjusting member is configured to include a push member comprising a tapered portion provided in that portion thereof, which abuts against at least a back surface of the convex-shaped leaf spring, and a hole, the push member serving to push the convex-shaped leaf spring, and a screw member fixedly inserted into the hole of the push member in a manner to move integrally together with the push member, and serving to adjust a height of the tapered portion of the push member relative to the convex-shaped leaf spring, whereby in the case where the screw member is driven, a large-width portion of the tapered portion abuts against the convex-shaped leaf spring, and in the case where the screw member is loosened, a small-width portion of the tapered portion abuts against the convex-shaped leaf spring. Thereby, by driving the screw member, a push force of the convex-shaped leaf spring on the side of the slider can be increased, and by loosening the screw member, a push force of the convex-shaped leaf spring on the side of the slider can be decreased. As a result, it is possible to easily adjust a push force of the convex-shaped leaf spring on the side of the slider.

Also, in the third aspect, the slider bearing member is provided with the adjustment hole, through which the screw member of the push-force adjusting member can be adjusted from outside, whereby a push force of the convex-shaped leaf spring on the side of the slider can be adjusted by adjusting a thread fastening quantity of the screw member from outside through the adjustment hole, so that the push force can be adjusted without disassembling the stand for liquid crystal televisions. Thereby, when the stand for liquid crystal televisions is used for liquid crystal televisions having a plurality of sizes, the work of adjusting a push force can be simplified.

In a fourth aspect of the invention, there is provided with a stand for a liquid crystal display including: a stand member mounting on a back surface of the liquid crystal display to support the liquid crystal display in an inclined state at a predetermined angle, the stand member including a support portion and two tip ends; a holding member, to which the two tip ends of the stand member are mounted, the holding member including; a slider mounted to the tip ends of the stand member; a slider bearing member that movably supports the slider; an abutment member provided on the slider bearing member and arranged to abut against a side surface of the slider; and a push-force adjusting member, for adjusting a push force of the abutment member relative to a side surface of the slider, provided on the slider bearing member and push the abutment member against the side surface of the slider.

With the stand for liquid crystal displays in the fourth aspect of the invention, the slider bearing member is provided with the abutment member, which is arranged to abut against the side of the slider, and the push-force adjusting member, which pushes the abutment member against the side of the slider, whereby the slider can be inhibited from moving due to the dead weight of the liquid crystal display. Thereby, the stand member mounted on the slider can be inhibited from moving due to the dead weight of the liquid crystal display, and when an angle of the stand member is to be adjusted, application of a force equal to or larger than a predetermined moving force makes it possible to move the slider against a push force of the abutment member on the side of the slider. Thereby, an expandable length of the stand member can be adjusted relative to the holding member in a range, in which the side of the slider abuts against the abutment member, so that an inclination of the liquid crystal display can be adjusted in a predetermined angular range. Also, an inclination of the liquid crystal display can be adjusted by extending and contracting the stand member, so that it is possible to adjust an inclination of the liquid crystal display without shifting a position of the liquid crystal display and a position of the support of the stand member relative to a rest surface. Thereby, a distance between a position, in which the liquid crystal display rests, and a position, in which the stand member rests, can be decreased as compared with the case where an inclination of the liquid crystal display is adjusted by adjusting an opening angle of the stand member relative to the liquid crystal display, so that the installation space can be reduced correspondingly. Also, by providing the push-force adjusting member that adjusts a push force of the abutment member on the side of the slider, the push-force adjusting member is used to enable appropriately adjusting a push force required for restricting movements of the stand member due to the dead weight of the liquid crystal display even in the case where a load on the stand member connected to the slider is varied attributable to different sizes of liquid crystal displays. As a result, the stand for liquid crystal displays can be used in common for liquid crystal displays having a plurality of sizes.

Also, with the stand for liquid crystal displays in the fourth aspect, the abutment member preferably includes a convex-shaped leaf spring. With such configuration, the leaf spring has a smooth surface, and so the slider can be moved smoothly.

With the stand for liquid crystal displays in the fourth aspect, the push-force adjusting member preferably includes a push member comprising a tapered portion provided in that portion thereof, which abuts against at least the abutment member, and a hole, the push member serving to push the abutment member against a side of the slider, and a screw member fixedly inserted into the hole of the push member in a manner to move integrally together with the push member, and serving to adjust a height of the tapered portion of the push member relative to the abutment member. With such configuration, in the case where the screw member is driven, a large-width portion of the tapered portion abuts against the abutment member, and in the case where the screw member is loosened, a small-width portion of the tapered portion abuts against the abutment member. Thereby, by driving the screw member, a push force of the abutment member on the side of the slider can be increased, and by loosening the screw member, a push force of the abutment member on the side of the slider can be decreased. As a result, it is possible to easily adjust a push force of the abutment member on the side of the slider.

In this case, the slider bearing member preferably has an adjustment hole, through which the screw member can be adjusted from outside. With such configuration, a push force of the abutment member on the side of the slider can be adjusted by adjusting a thread fastening quantity of the screw member from outside through the adjustment hole, so that the push force can be adjusted without disassembling the stand for liquid crystal displays. Thereby, when the stand for liquid crystal displays is used for liquid crystal displays having a plurality of sizes, the work of adjusting a push force can be simplified.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Embodiments of the invention will be described with reference to the drawings.

Figure 1:
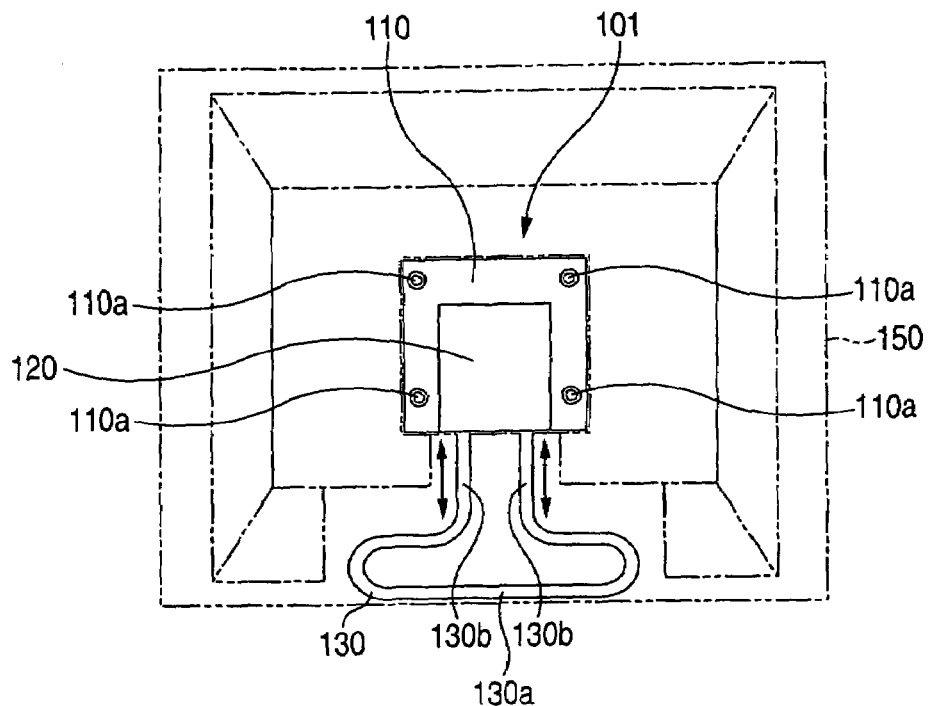
FIG. 1 is a rear view showing a liquid crystal television provided with a stand for liquid crystal televisions, according to a first embodiment of the invention.
Figure 2:
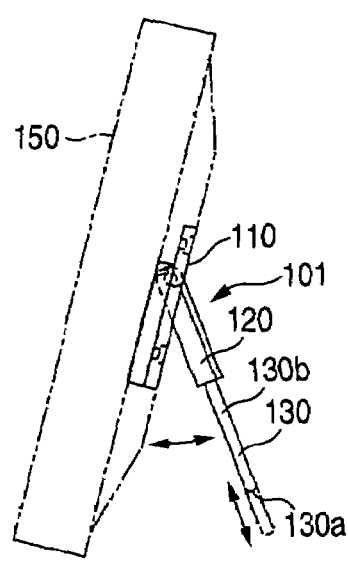
FIG. 2 is a side view showing the liquid crystal television shown in FIG. 1 when viewed from the left side.
Figure 3:
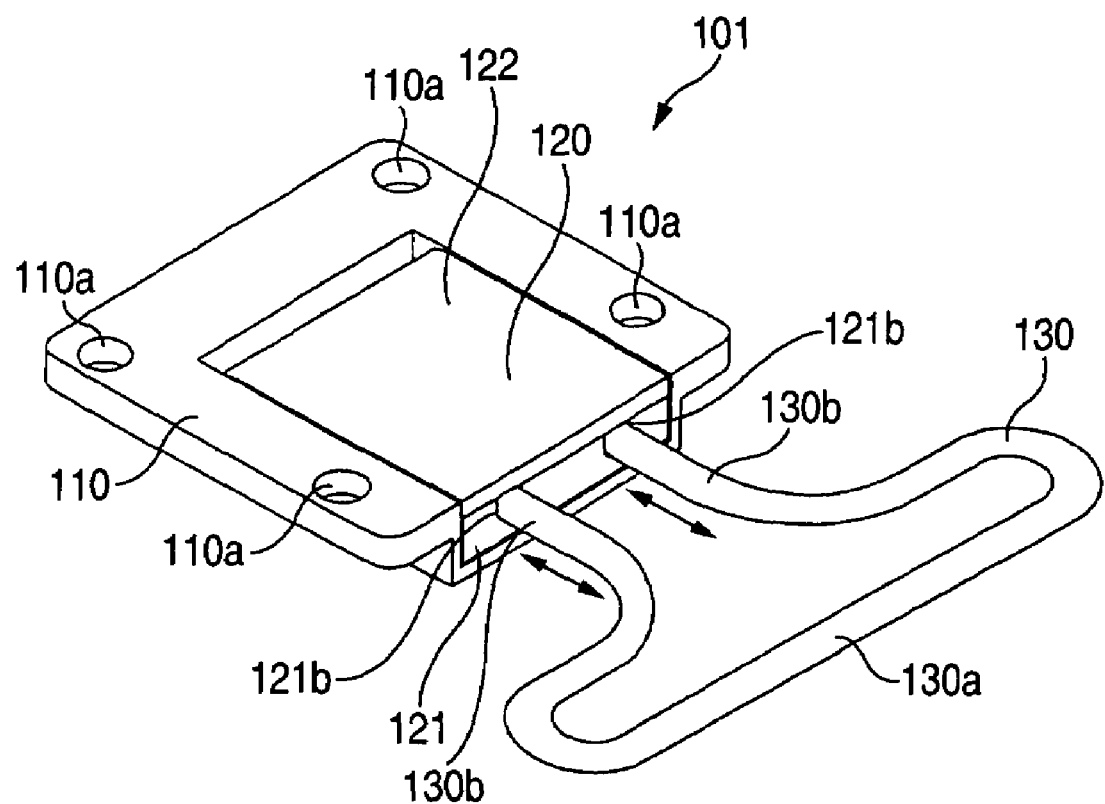
FIG. 3 is a perspective view showing the stand for liquid crystal televisions, according to the first embodiment of the invention.
Figure 4:
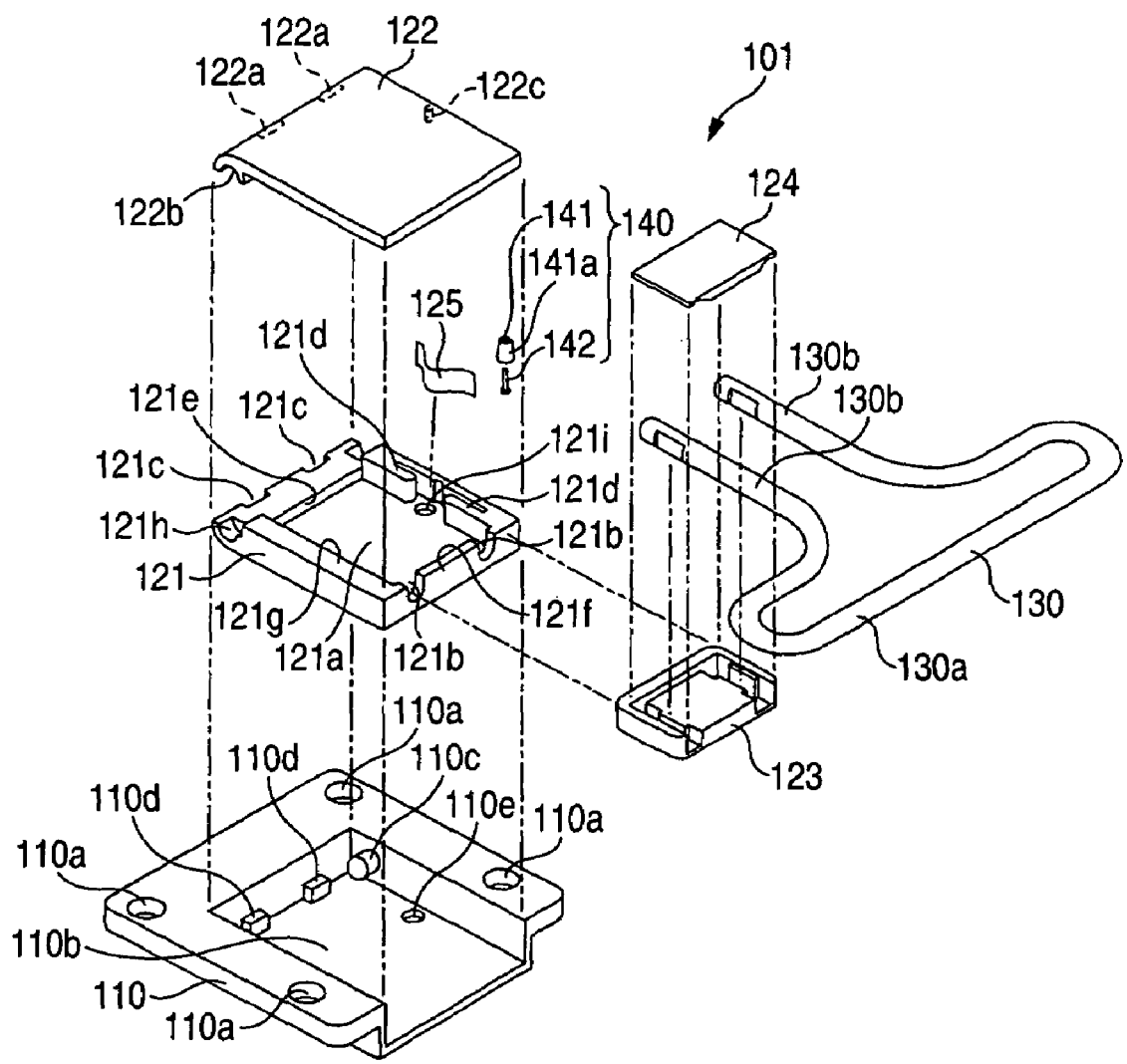
FIG. 4 is an exploded, perspective view showing the stand for liquid crystal televisions, according to the first embodiment of the invention and shown in FIG. 3.
Figure 5:
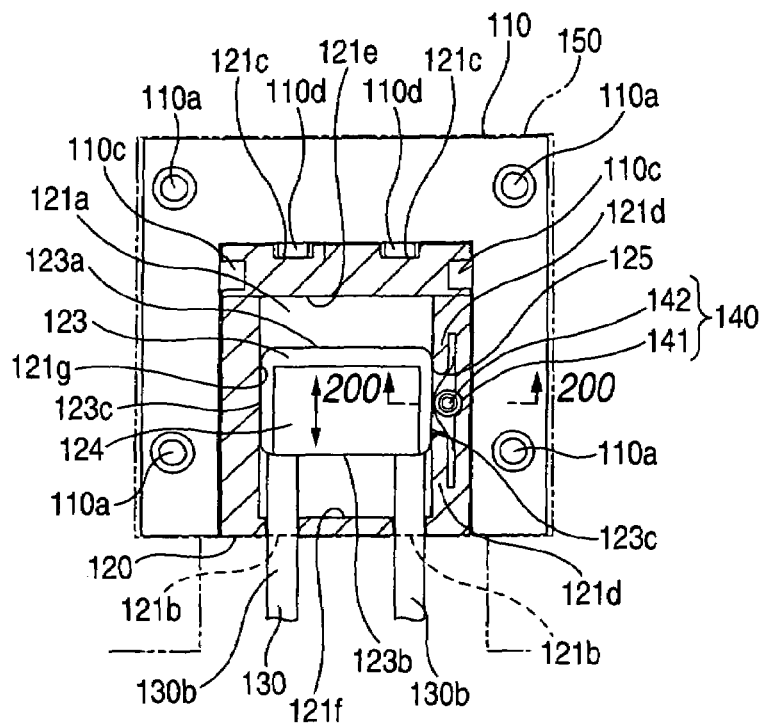
FIG. 5 is a partial, enlarged view showing an internal construction of the stand for liquid crystal televisions, according to the first embodiment of the invention and shown in FIG. 3.
Figure 6:
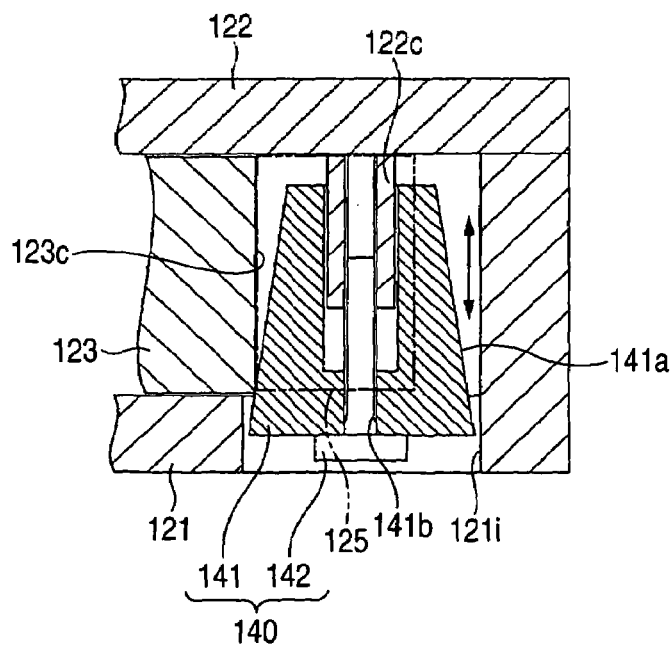
FIG. 6 is a fragmentary, cross sectional view, taken along the line 200-200, of the stand for liquid crystal televisions, according to the embodiment of the invention and shown in FIG. 5.
Figure 7:
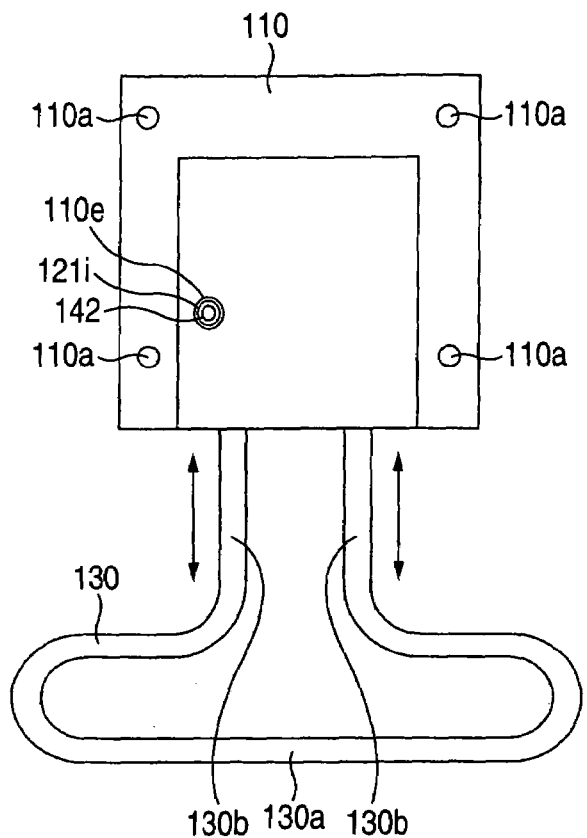
FIG. 7 is a rear view showing the stand for liquid crystal televisions, according to the embodiment of the invention.
Figure 8:
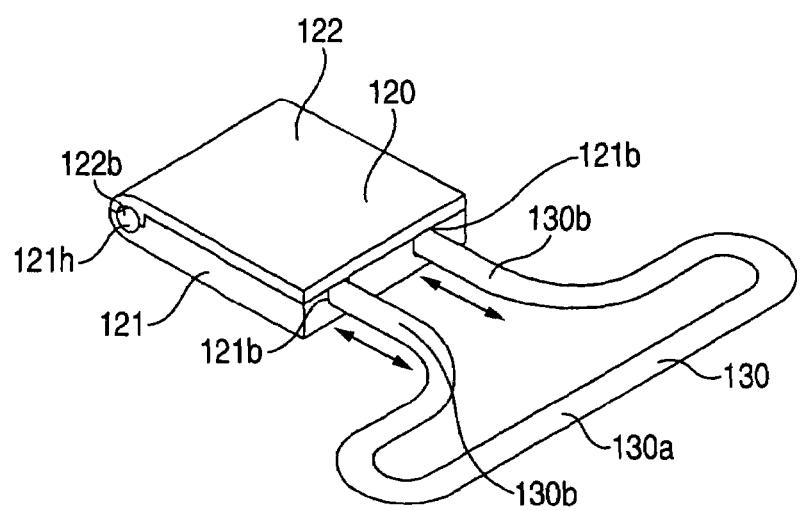
FIG. 8 is a perspective view showing a holding member and a stand member in the stand for liquid crystal televisions, according to the embodiment of the invention and shown in FIG. 3.
Figure 9:
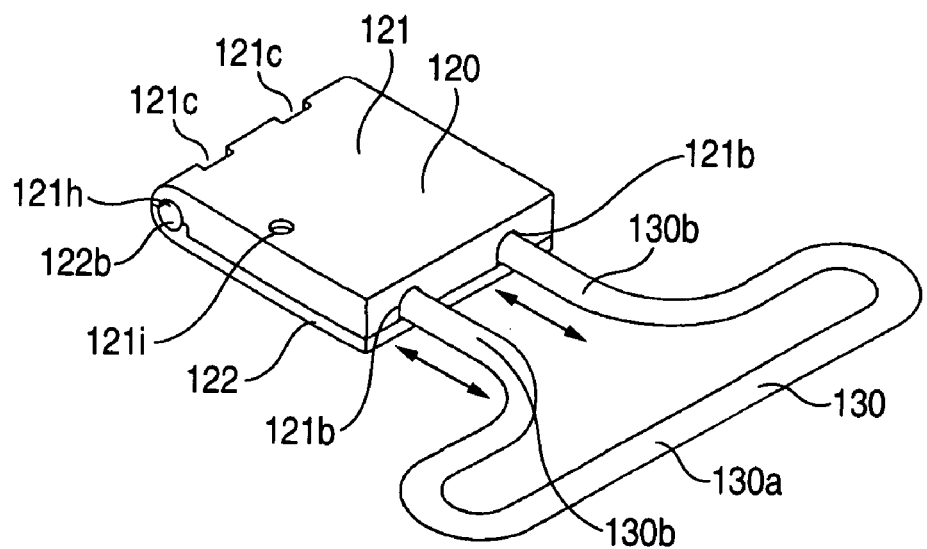
FIG. 9 is a perspective view showing the holding member and the stand member shown in FIG. 8 when viewed from the back side.
Figure 10:
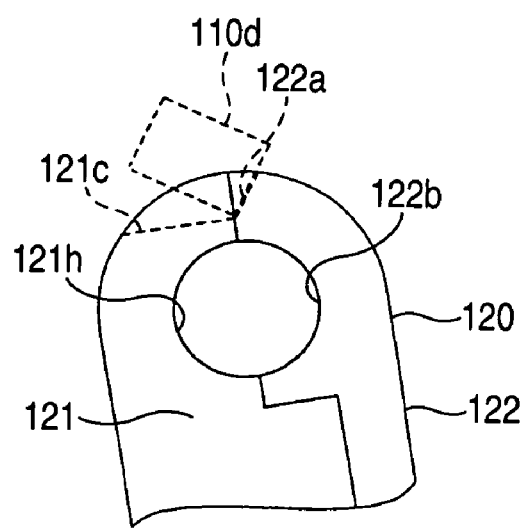
FIG. 10 is a partial, enlarged view showing the holding member shown in FIG. 8.
Figure 11:
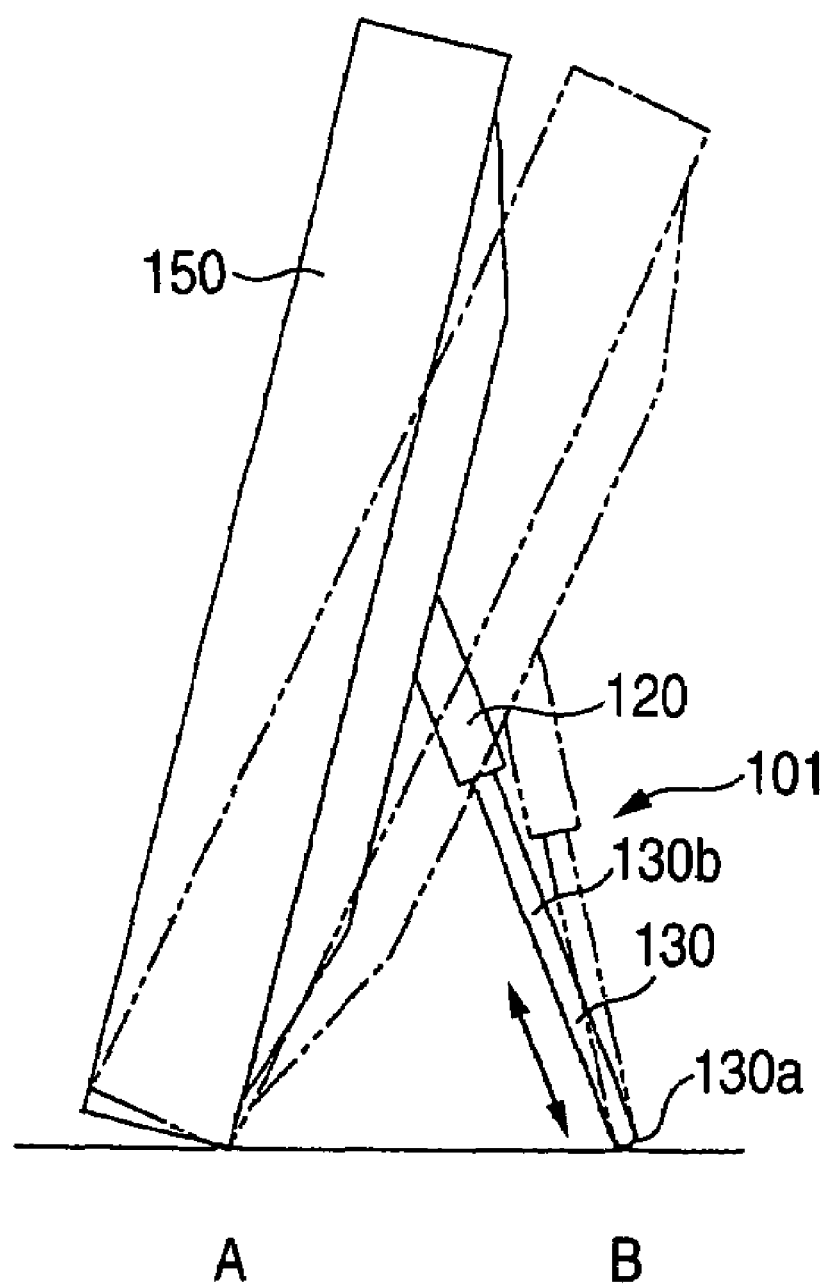
FIG. 11 is a side view showing a state, in which a liquid crystal television provided with the stand for liquid crystal televisions, according to the embodiment of the invention, rests on a rest surface.

FIG. 1 is a rear view showing a liquid crystal television provided with a stand for liquid crystal televisions, according to an embodiment of the invention. FIG. 2 is a side view showing the liquid crystal television shown in FIG. 1 when viewed from the left side. FIG. 3 is a perspective view showing the stand for liquid crystal televisions, according to the embodiment of the invention FIG. 4 is an exploded, perspective view showing the stand for liquid crystal televisions, according to the embodiment of the invention and shown in FIG. 3. FIG. 5 is a partial, enlarged view showing an internal construction of the stand for liquid crystal televisions, according to the embodiment of the invention and shown in FIG. 3. FIG. 6 is a fragmentary, cross sectional view, taken along the line 200-200, of the stand for liquid crystal televisions, according to the embodiment of the invention and shown in FIG. 5. FIG. 7 is a rear view showing the stand for liquid crystal televisions, according to the embodiment of the invention. FIG. 8 is a perspective view showing a holding member and a stand member in the stand for liquid crystal televisions, according to the embodiment of the invention and shown in FIG. 3. FIG. 9 is a perspective view showing the holding member and the stand member shown in FIG. 8 when viewed from the back side. FIG. 10 is a partial, enlarged view showing the holding member shown in FIG. 8. FIG. 11 is a side view showing a state, in which a liquid crystal television provided with the stand for liquid crystal televisions, according to the embodiment of the invention, rests on a rest surface.

The base member 110 includes, as shown in FIGS. 3 and 4, holes 110a, recesses 110b, struts 110c, and holding-member stoppers 110d. The base member 110 is mounted to a back surface of the stand 101 for liquid crystal televisions, by means of screws (not shown) through the four holes 110a provided on the base member 210 as shown in FIGS. 2 and 3.

A holding member 120 is mounted to be able to turn about struts 110c of a base member 110. The holding member 120 includes, as shown in FIG. 4, a lower cover 121, an upper cover 122, a slider 123, a slider cover 124, a leaf spring 125, and a push-force adjusting member 140. In addition, "lower cover" is exemplary of "slider bearing member" in the invention. The lower cover 121 includes, as shown in FIG. 4 and FIGS. 8 to 10, a recess 121a, relief holes 121b, notches 121c, hooks 121d, a first stopper 121e, a second stopper 121f, recess sides 121g, bearing portions 121h, and an adjustment hole 121i. Also, as shown in FIGS. 4 and 10, the upper cover 122 of the holding member 120 includes stopper bearing surfaces 122a, bearing portions 122b, and a boss member 122c. Also, the bearing portions 121h of the lower cover 121 and the bearing portions 122b of the upper cover 122 are mounted in a manner to interpose therebetween struts 110c formed on the base member 110. Thereby, the holding member 120 comprising the lower cover 121 and the upper cover 122 is made rotatable about the struts 110c of the base member 110.

When the holding member 120 is turned relative to the base member 110, the stopper bearing surfaces 222a of the upper cover 122 and the holding-member stoppers 210d of the base member 110 abut against each other at a predetermined opening angle.

Also, the stand member 130 includes, as shown in FIGS. 1 and 2, a support 130a extended horizontally relative to the rest surface and adapted to abut against the rest surface, and two tip ends 130b extended in a direction perpendicular to the rest surface. Also, the stand member 130 is constructed to be able to extend and contract relative to the holding member 120 as shown in FIGS. 1, 2 and 11. Therefore, by turning the holding member 220 relative to the base member 110 to form a predetermined opening angle therebetween and then extending and contracting the stand member 130 of the stand 101 for liquid crystal televisions as shown in FIG. 2, an inclination of the liquid crystal television 150 can be adjusted. In addition, when adjusting an inclination of the liquid crystal television 150, a distance between a position A, in which the liquid crystal television 250 rests, and a position B, in which the support 230a of the stand member 130 of the stand 101 for liquid crystal televisions rests, is maintained constant.

Here, according to the embodiment, the slider 123 is formed to be rectangular in shape as shown in FIGS. 4 and 5, and includes an upper end surface 123a, a lower end surface 123b, and two substantially flat side portions 123c. The slider 123 is fitted into the recess 121a of the lower cover 121 of the holding member 120 to be vertically movable one of the side portions 123c of the slider 123 abuts against the recess side 121g of the recess 121a of the lower cover 121. Also, the slider cover 124 is mounted to the slider 123 in a state, in which the two tip ends 130b of the stand member 130 are fitted in parallel into the side portions 123c of the slider 123. Also, as shown in FIG. 5, the two tip ends 130b of the stand member 130 mounted on the slider 123 are movably fitted into the relief holes 121b provided on the lower cover 121.

Also, the convex-shaped leaf spring 125 is arranged to abut against one of the side portions 123c of the slider 123 as shown in FIG. 5. Both ends of the convex-shaped leaf spring 125 are fitted into the hooks 121d of the lower cover 121. Also, a tip end of the convex-shaped leaf spring 125 is pushed from a back surface of the leaf spring 125 by the push-force adjusting member 140.

Here, according to the embodiment, the push-force adjusting member 140 includes, as shown in FIGS. 5 and 6, a push member 141 made of brass, and a screw member 142. Also, the push member 141 includes a tapered portion 141a, and a hole 141b. A threaded portion of the screw member 142 is fixedly inserted into the hole 141b as by press fit whereby the push member 141 is configured to unite with the screw member 142 to move up and down. Also, a tip end of the threaded portion of the screw member 142 engages with a female threaded portion, which is formed in the boss member 122c provided integral with the upper cover 122. The tapered portion 141a of the push member 141 abuts against the convex-shaped leaf spring 125 from a back surface thereof and pushes the back surface of the convex-shaped leaf spring 125 with a predetermined push force.

Also, as shown in FIGS. 6 and 7, provided on the base member 110 and the lower cover 121 of the holding member 120, respectively, are an adjustment hole 121i and an adjustment hole 110e, which make it possible to adjust the screw member 142 of the push-force adjusting member 140 from outside.

When the stand 101 for liquid crystal television is to be adjusted, the holding member 220 is turned relative to the base member 110 in an opening direction as shown in FIG. 2. Thereby, as shown in FIG. 10, the stopper bearing surfaces 122a of the upper cover 122 of the holding member 220 and the holding-member stoppers 110d of the base member 210 abut against each other at a predetermined opening angle, so that the holding member 120 is fixed at the predetermined opening angle. Thereafter, by extending and contracting the stand member 130, an inclination of the liquid crystal television 150 is adjusted to an optional angle.

In addition, when an inclination of the liquid crystal television 150 is adjusted, a distance between a position A, in which the liquid crystal television 150 rests, and a position B, in which a support 130a of the stand member 130 of a stand 101 for liquid crystal televisions rests, is maintained constant as shown in FIG. 11.

In FIG. 5, the upper end surface 123a and the lower end surface 123b of the slider 123 do not abut against the first stopper 121e and the second stopper 121f of the recess 121a of the lower cover 121. In this case, since the dead weight of the liquid crystal television 150 (see FIG. 2) is applied on the lower cover 121, a force tending to move the lower cover 121 downward relative to the slider 123 acts. Therefore, a force tending to move the slider 123 upward relative to the lower cover 121 acts. In the embodiment, a movement restricting force generated by a push force of the convex-shaped leaf spring 125, which abuts against the side center portion 123c of the slider 123, is larger than the force tending to move the slider 123 upward. That is, since the columnar-shaped rubber material constituting the push member 226 is deformed elastically in this state to be made elliptical in shape, a force, by which the rubber material is going to return elastically to the columnar shape, acts as a push force of the convex-shaped leaf spring 225. Therefore, the slider 123 is restricted in moving due to the dead weight of the liquid crystal television 150.

In adjusting an inclination of the liquid crystal television 150, a larger force than a movement restricting force generated by the convex-shaped leaf spring 225 is applied to the stand member 130 when the stand member 230 should be extended or contracted relative to the holding member 120. Thereby, the slider 123 connected to the two tip ends 130b of the stand member 130 is moved in a direction substantially in parallel to a direction, in which the stand member 130 is extended or contracted In the case where the stand member 130 is contracted upward to a maximum relative to the holding member 120, the upper end surface 123a of the slider 123, to which the two tip ends 130b of the stand member 130 are mounted, abuts against the first stopper 121e of the lower cover 121. Meanwhile, in the case where the stand member 130 is extended downward to a maximum relative to the holding member 120, the lower end surface 123b of the slider 123 connected to the two tip ends 130b of the stand member 130 abuts against the second stopper 121f of the lower cover 121.

Here, with reference to FIG. 6, an explanation will be given to a method of adjusting a movement restricting force (push force) on the stand member 130 of the stand 101 for liquid crystal televisions, according to the embodiment. According to the embodiment, the push force on the stand member 130 is adjusted by adjusting a thread fastening quantity of the screw member 142 through the adjustment holes 121i and 110e (see FIG. 4). More specifically, when the screw member 142 of the push-force adjusting member 140 is driven, a large-width portion of the tapered portion 141a abuts against the back surface of the convex-shaped leaf spring 125, and when the screw member 142 is loosened, a small-width portion of the tapered portion 141a abuts against the convex-shaped leaf spring 125. Thereby, in the case where the screw member 142 is driven, the push member 141 of the push-force adjusting member 140 is increased in resistance to the convex-shaped leaf spring 125, and in the case where the screw member 142 is loosened, the push member 141 of the push-force adjusting member 140 is decreased in resistance to the convex-shaped leaf spring 125. As a result, in the case where the screw member 142 is driven, a push force of the convex-shaped leaf spring 125 on the side portion 123c of the slider 123 is increased, and in the case where the screw member 142 is loosened, a push force of the convex-shaped leaf spring 125 on the side portion 123c of the slider 123 is decreased. Thereby, in the case where a common stand 101 for liquid crystal televisions is used for liquid crystal televisions 150 that are different in dead weight and have a plurality of sizes, it becomes possible to adjust the push force according to dead weights for respective sizes.

According to the embodiment, by providing the push-force adjusting member 140 that adjusts a push force of the convex-shaped leaf spring 125 on the side of the slider 123, the push-force adjusting member 140 is used to enable appropriately adjusting a push force required for restricting movements of the stand member 130 due to the dead weight of the liquid crystal television 150 even in the case where a load on the stand member 130 connected to the slider 123 is varied attributable to different sizes of liquid crystal televisions 150. As a result, the stand 101 for liquid crystal televisions can be used in common for liquid crystal televisions 150 having a plurality of sizes.

According to the embodiment, the adjustment holes 121i and 110e are provided on the lower cover 121 and the base member 110 to make it possible to adjust the screw member 142 of the push-force adjusting member 140 from outside whereby a push force of the convex-shaped leaf spring 125 on the side of the slider 123 can be adjusted by adjusting a thread fastening quantity of the screw member 142 through the adjustment hole 121i(110e), so that the push force can be adjusted without disassembling the stand 101 for liquid crystal televisions. Thereby, when the stand 101 for liquid crystal televisions is used for liquid crystal televisions 150 having a plurality of sizes, the work of adjusting a push force can be simplified.

According to the embodiment, the lower cover 121 is provided with the convex-shaped leaf spring 125 that is arranged in a manner to abut against the side of the slider 123, and the push-force adjusting member 140 that pushes the convex-shaped leaf spring 125 against the side of the slider 123, whereby it is possible to inhibit the slider 123 from moving due to the deadweight of the liquid crystal television 150. Thereby, it is possible to inhibit the stand member 130 mounted to the slider 123 from moving due to the dead weight of the liquid crystal television 150, and when the stand member 130 is to be adjusted in angle, application of a force equal to or larger than a predetermined moving force enables moving the slider 123 against a push force of the convex-shaped leaf spring 125 on the side portion 123c of the slider 123. Thereby, an expandable length of the stand member 130 can be adjusted relative to the holding member 120 in a range, in which the side portion 123c of the slider 123 abuts against the convex-shaped leaf spring 125, so that it is possible to adjust an inclination of the liquid crystal television 150 within a predetermined angular range. Also, an inclination of the liquid crystal television 150 can be adjusted by extending and contracting the stand member 130, so that it is possible to adjust an inclination of the liquid crystal television 150 without shifting a position of the liquid crystal television 150 and a position of the support 130a of the stand member 130 relative to the rest surface. Thereby, a distance between a position, in which the liquid crystal television 150 rests, and a position, in which the stand member 130 rests, can be decreased as compared with the case where an inclination of the liquid crystal television 150 is adjusted by adjusting an opening angle of the stand member 130 relative to the liquid crystal television 150, so that the installation space can be reduced correspondingly.

According to the embodiment, the convex-shaped leaf spring 125 constitutes an abutment member that abuts against the side of the slider 123, and the leaf spring 125 has a smooth surface, so that the slider 123 can be moved smoothly.

While the push member of the push-force adjusting member in the embodiment adopts, for example, one having a tapered side, the invention is not limited thereto but the push member may have a barrel-shaped side other than a tapered side.

While the slider in the embodiment is formed to be rectangular in shape, the invention is not limited thereto but the slider may be formed to be cylindrical or the like in shape.

While the push member of the push-force adjusting member in the embodiment is made of brass, the invention is not limited thereto but the push member may be made of rubber.

Figure 12:
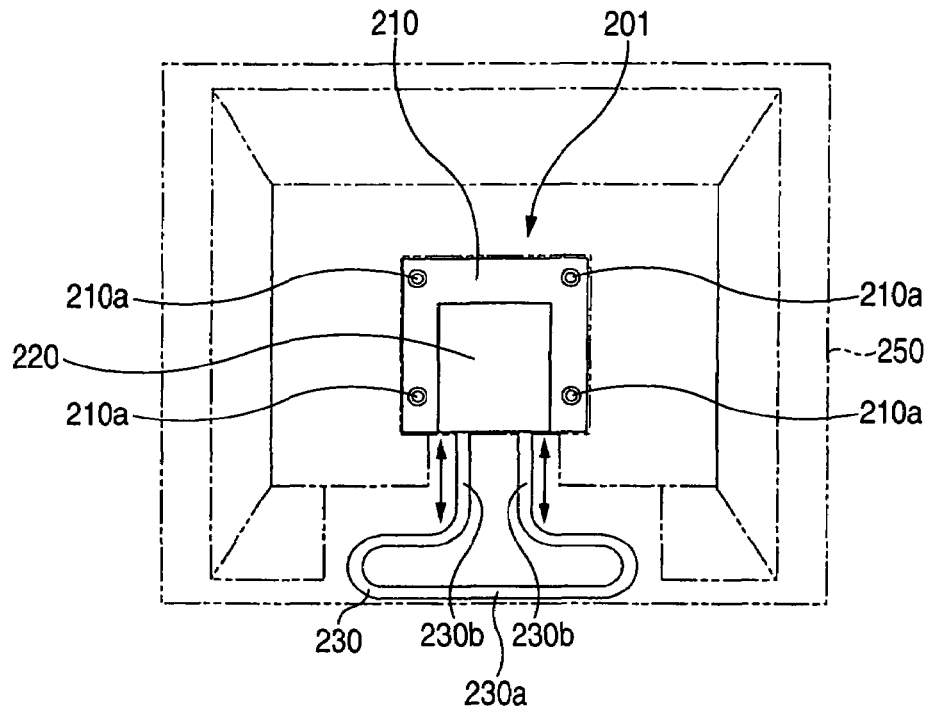
FIG. 12 is a rear view showing a liquid crystal television provided with a stand for liquid crystal televisions, according to a second embodiment of the invention.
Figure 13:
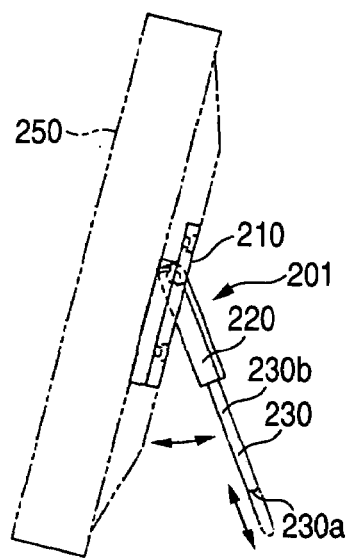
FIG. 13 is a side view showing the liquid crystal television shown in FIG. 12 when viewed from the left side.
Figure 14:
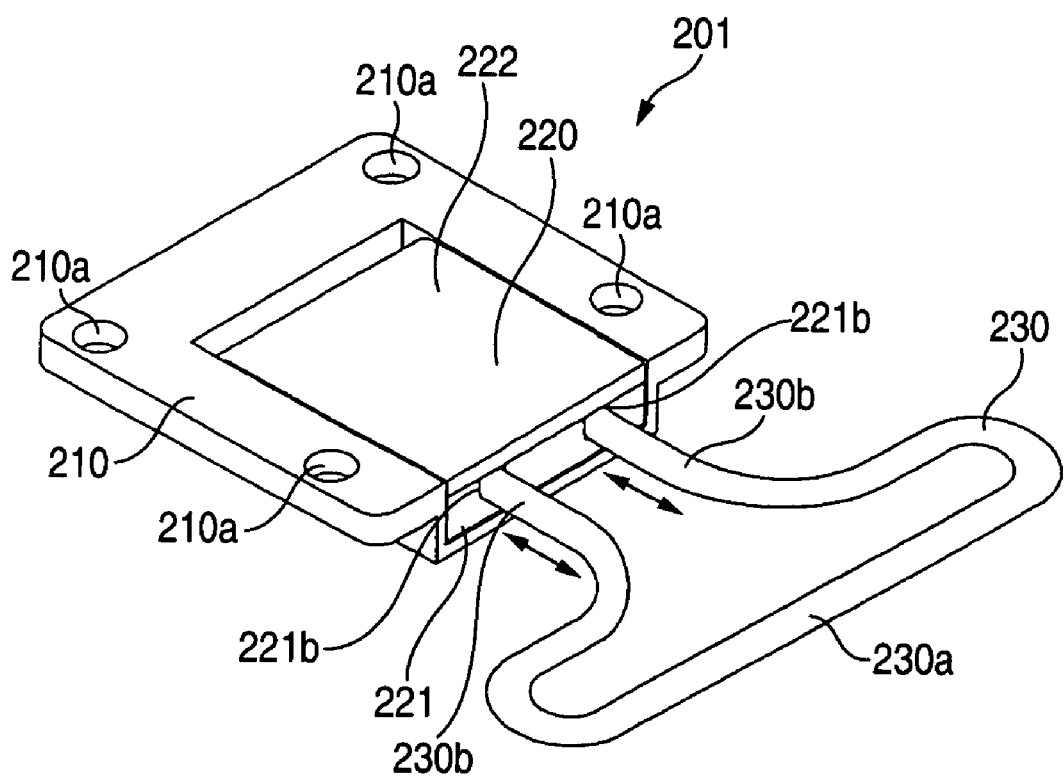
FIG. 14 is a perspective view showing the stand for liquid crystal televisions, according to the second embodiment of the invention.
Figure 15:
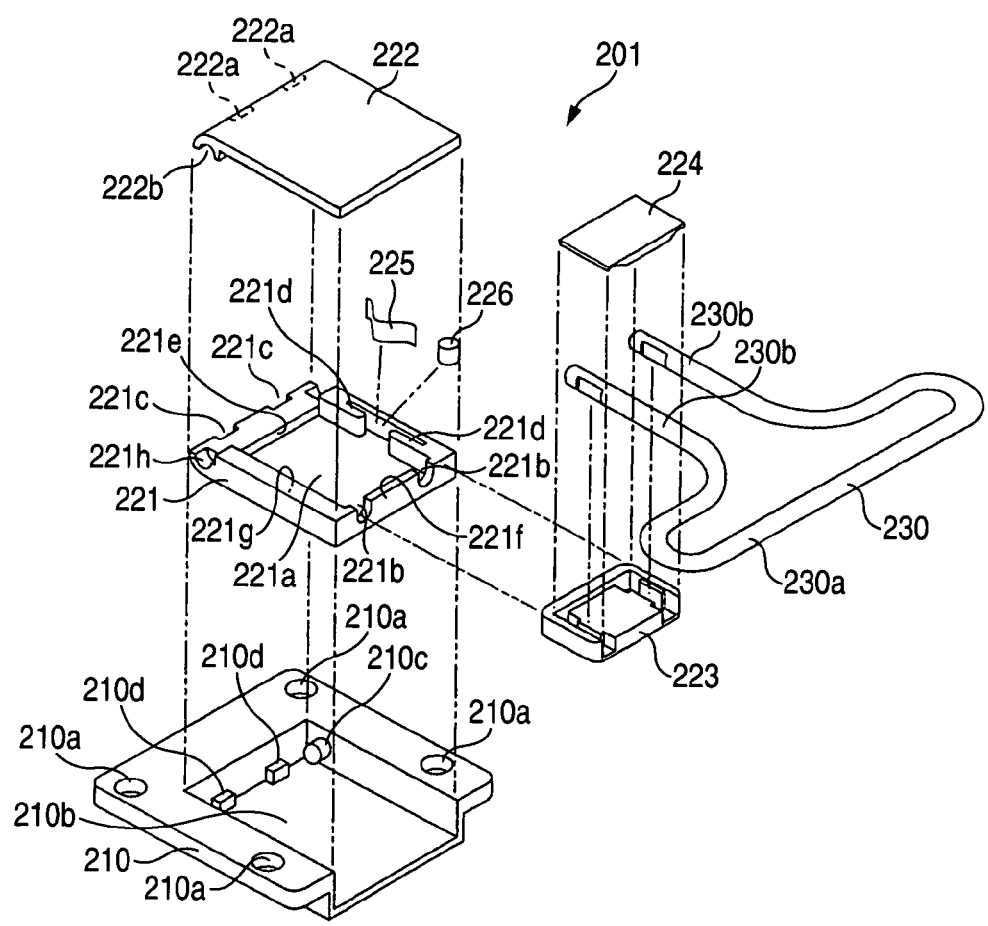
FIG. 15 is an exploded, perspective view showing the stand for liquid crystal televisions, shown in FIG. 14.
Figure 16:
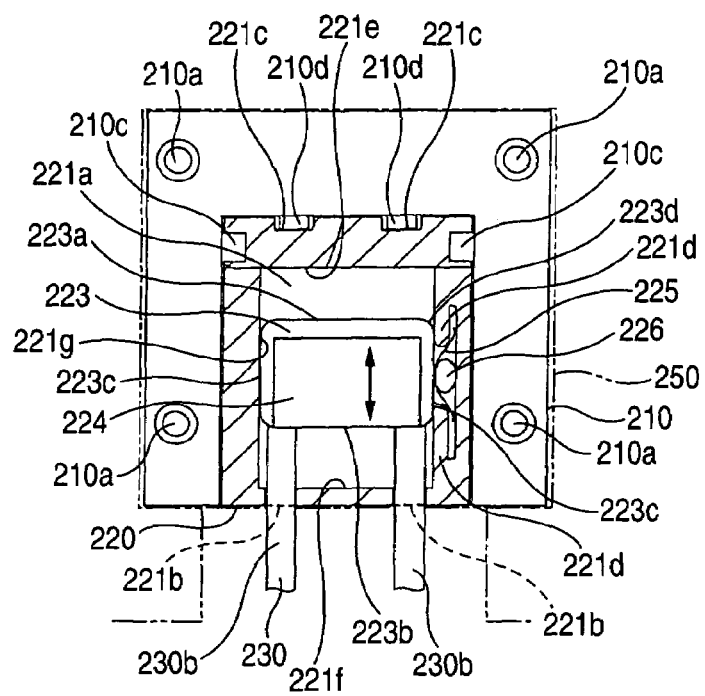
FIG. 16 is a partial, enlarged view showing an internal construction of the stand for liquid crystal televisions, shown in FIG. 14.
Figure 17:
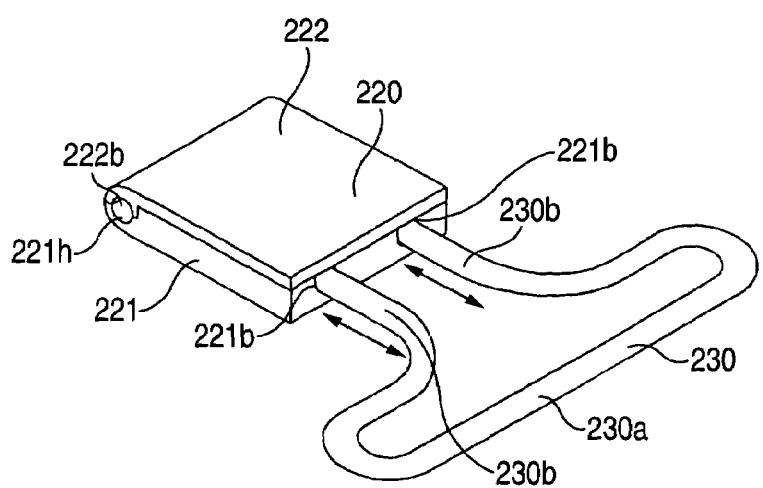
FIG. 17 is a perspective view showing a holding member and a stand member in the stand for liquid crystal televisions, shown in FIG. 14.
Figure 18:
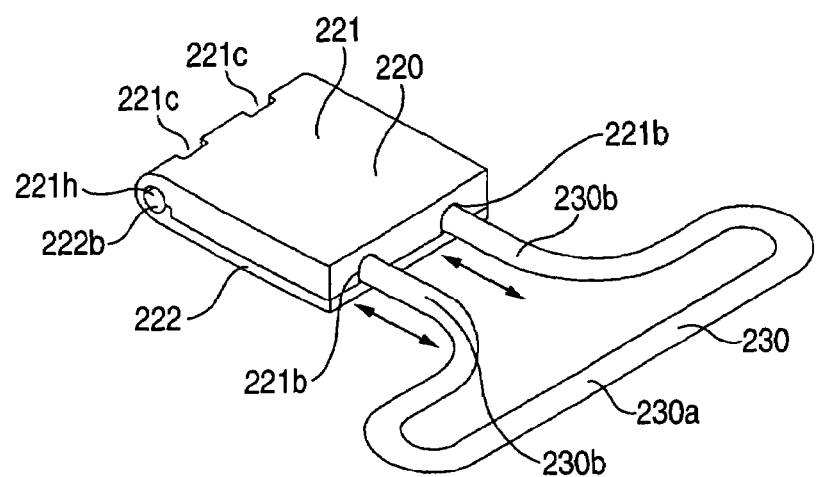
FIG. 18 is a perspective view showing the holding member and the stand member shown in FIG. 17 when viewed from the back side.
Figure 19:
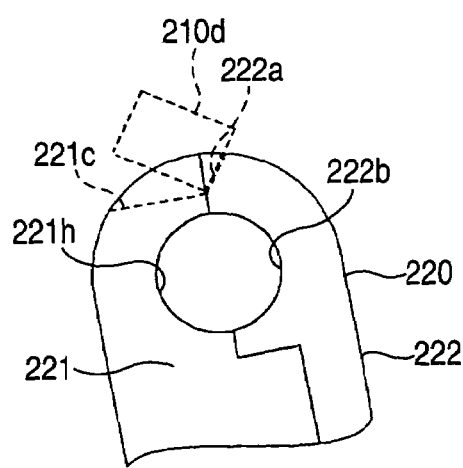
FIG. 19 is a partial, enlarged view showing the holding member shown in FIG. 18.
Figure 20:
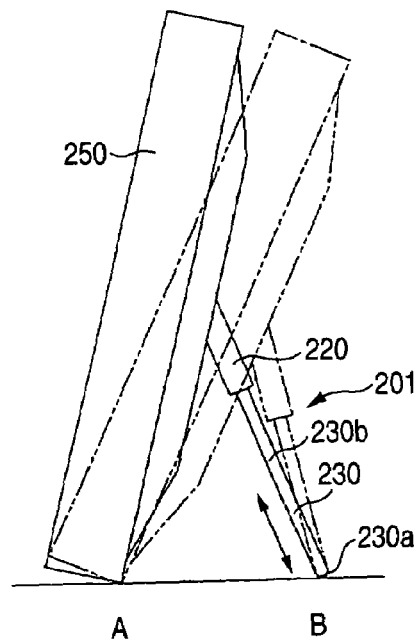
FIG. 20 is a side view showing a state, in which a liquid crystal television provided with the stand for liquid crystal televisions, according to the second embodiment of the invention, rests on a rest surface.

FIG. 12 is a rear view showing a liquid crystal television provided with a stand for liquid crystal televisions, according to an embodiment of the invention. FIG. 13 is a side view showing the liquid crystal television shown in FIG. 12 when viewed from the left side. FIG. 14 is a perspective view showing the stand for liquid crystal televisions, according to the embodiment of the invention. FIG. 15 is an exploded, perspective view showing the stand for liquid crystal televisions, shown in FIG. 14. FIG. 16 is a partial, enlarged view showing an internal construction of the stand for liquid crystal televisions, shown in FIG. 14. FIG. 17 is a perspective view showing a holding member and a stand member in the stand for liquid crystal televisions, shown in FIG. 14. FIG. 18 is a perspective view showing the holding member and the stand member shown in FIG. 17 when viewed from the back side. FIG. 19 is a partial, enlarged view showing the holding member shown in FIG. 18. FIG. 20 is a side view showing a state, in which a liquid crystal television provided with a stand for liquid crystal televisions, according to an embodiment of the invention, rests on a rest surface.

With reference to FIGS. 12 to 20, an explanation will be given to a construction of a stand for liquid crystal televisions, according to the embodiment. A stand 201 for liquid crystal televisions, according to the embodiment, includes, as shown in FIGS. 12 and 13, a base member 210, a holding member 220, and a pipe-shaped stand member 230.

The base member 210 includes, as shown in FIGS. 14 and 15, holes 210a, recesses 210b, struts 210c, and holding-member stoppers 210d. The base member 210 is mounted to a back surface of the stand 201 for liquid crystal televisions, by means of screws (not shown) through the four holes 210a provided on the base member 210 as shown in FIGS. 12 and 13.

The holding member 220 is mounted to be able to turn about the struts 210c of the base member 210. The holding member 220 includes, as shown in FIG. 15, a lower cover 221, an upper cover 222, a slider 223, a slider cover 224, a convex-shaped leaf spring 225, and a push member 226 made of a rubber material. The lower cover 221 includes, as shown in FIG. 15 and FIGS. 17 to 19, a recess 221a, relief holes 221b, notches 221c, hooks 221d, a first stopper 221e, a second stopper 221f, recess sides 221g, and bearing portions 221h. Also, as shown in FIGS. 15 and 19, the upper cover 222 of the holding member 220 includes stopper bearing surfaces 222a and bearing portions 222b. Also, the bearing portions 221h of the lower cover 221 and the bearing portions 222b of the upper cover 222 are mounted in a manner to interpose therebetween the struts 210c formed on the base member 210. Thereby, the holding member 220 comprising the lower cover 221 and the upper cover 222 is made rotatable about the struts 210c of the base member 210.

Also, when the holding member 220 is turned relative to the base member 210, the stopper bearing surfaces 222a of the upper cover 222 and the holding-member stoppers 210d of the base member 210 abut against each other at a predetermined opening angle.

The stand member 230 includes, as shown in FIGS. 12 and 13, a support 230a extended horizontally relative to the rest surface and adapted to abut against the rest surface, and two tip ends 230b extended in a direction perpendicular to the rest surface. Also, the stand member 230 is constructed to be able to extend and contract relative to the holding member 220 as shown in FIGS. 12, 13 and 20. Therefore, by turning the holding member 220 relative to the base member 210 to form a predetermined opening angle therebetween and then extending and contracting the stand member 230 of the stand 201 for liquid crystal televisions as shown in FIG. 13, an inclination of the liquid crystal television 250 can be adjusted. In addition, when adjusting an inclination of the liquid crystal television 250, a distance between a position A, in which the liquid crystal television 250 rests, and a position B, in which the support 230a of the stand member 230 of the stand 201 for liquid crystal televisions rests, is maintained constant.

Here, according to the embodiment, the slider 223 is formed to be rectangular in shape as shown in FIGS. 15 and 16, and includes an upper end surface 223a, a lower end surface 223b, substantially flat side center portions 223c, and both rounded side ends 223d. In addition, the upper end surface 223a and the lower end surface 223b, respectively, are exemplary of "one end surface" and "the other end surface" in the invention. The slider 223 is fitted into the recess 221a of the lower cover 221 of the holding member 220 to be vertically movable. Also, the slider cover 224 is mounted to the slider 223 in a state, in which the two tip ends 230b of the stand member 230 are fitted in parallel into the side center portions 223c of the slider 223. Also, as shown in FIG. 16, the two tip ends 230b of the stand member 230 mounted on the slider 223 are movably fitted into the releaf holes 221b provided on the lower cover 221.

The convex-shaped leaf spring 225 is arranged to abut against one of the substantially flat side center portions 223c of the slider 223. Both ends of the convex-shaped leaf spring 225 are fitted into the hooks 221d of the lower cover 221. The push member 226 made of a columnar-shaped rubber material is arranged on a back side of the convex-shaped leaf spring 225. A tip end of the convex-shaped leaf spring 225 is pushed against the substantially flat side center portion 223c of the slider 223 by a predetermined push force that is caused by an elastic restoring force of the elastically deformed push member 226 made of a rubber material. Thereby, the slider 223 is restricted in vertical movements.

Figure 21:
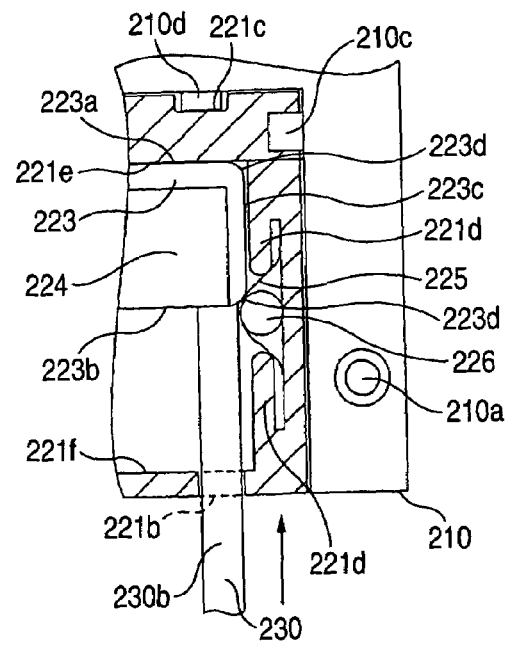
FIG. 21 is a partial, enlarged view showing an internal construction of the holding member when the stand member is contracted to a maximum relative to the holding member.
Figure 22:
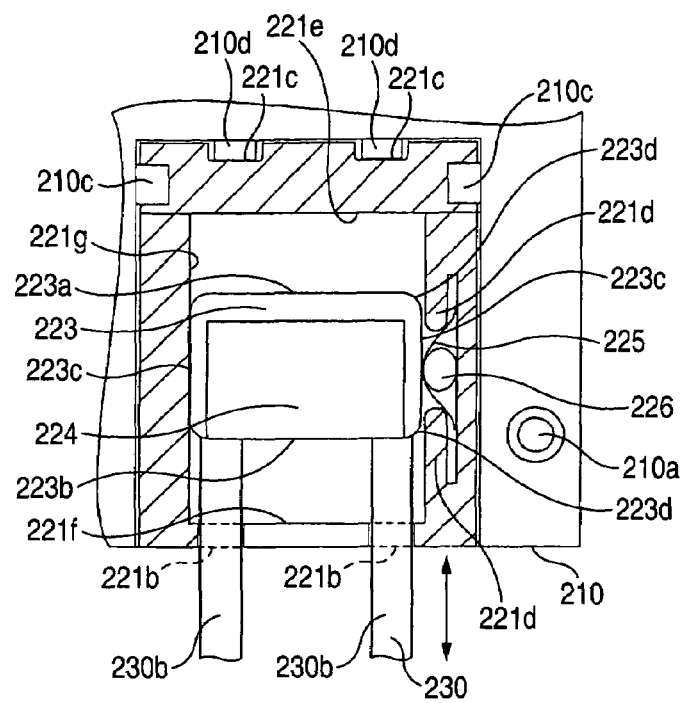
FIG. 22 is a partial, enlarged view showing a state, in which the stand member is extended to some extent relative to the holding member.
Figure 23:
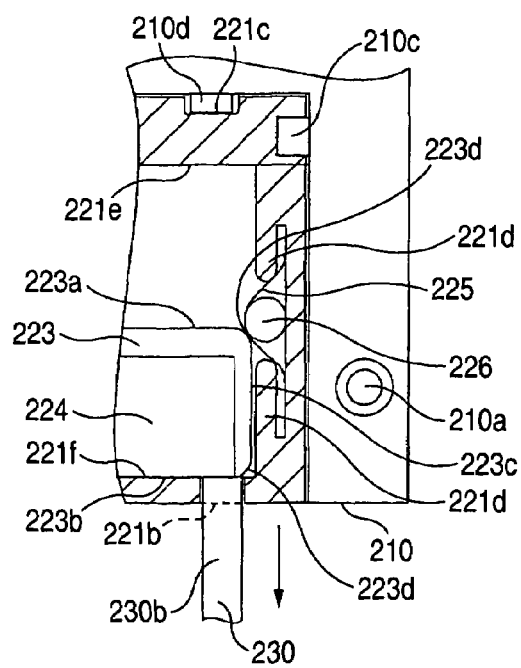
FIG. 23 is a partial, enlarged view showing an internal construction of the holding member when the stand member is extended to a maximum relative to the holding member.
Figure 24:
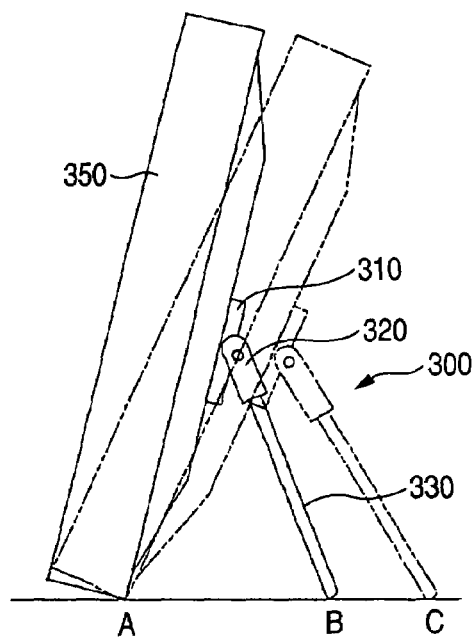
FIG. 24 is a schematic, side view showing a conventional stand provided with an angle adjustment mechanism when used as a stand for liquid crystal televisions.
Figure 25:
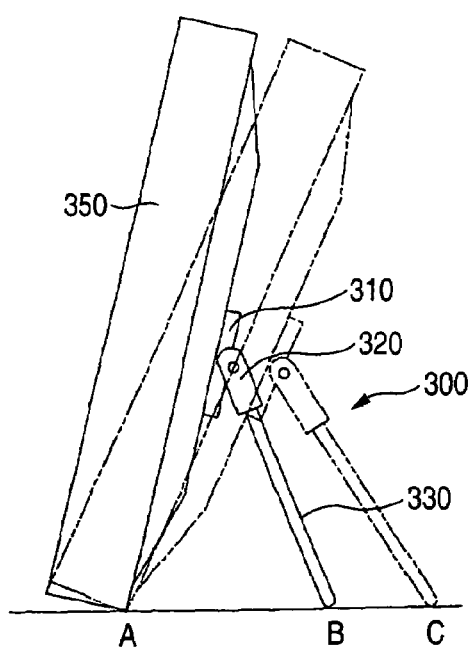
FIG. 25 is a schematic, side view showing a conventional stand provided with an angle adjustment mechanism when used as a stand for liquid crystal televisions.

FIGS. 21 to 23 are partial, enlarged views illustrating an operation of adjusting an inclination of the stand for liquid crystal televisions, according to the embodiment shown in FIG. 16. Next, an operation of the stand 201 for liquid crystal televisions, according to the embodiment, with reference to FIGS. 21 to 23.

First, when the stand 201 for liquid crystal televisions is to be adjusted, the holding member 220 is turned relative to the base member 210 in an opening direction as shown in FIG. 13. Thereby, as shown in FIG. 19, the stopper bearing surfaces 222a of the upper cover 222 of the holding member 220 and the holding-member stoppers 210d of the base member 210 abut against each other at a predetermined opening angle, so that the holding member 220 is fixed at the predetermined opening angle. Thereafter, by extending and contracting the stand member 230, an inclination of the liquid crystal television 250 is adjusted to an optional angle.

FIG. 21 shows a state, in which the stand member 230 is contracted to a maximum relative to the holding member 220 in a vertical direction. In this state, the upper end surface 223a of the slider 223, to which the two tip ends 230b of the stand member 230 are mounted, abuts against the first stopper 221e of the lower cover 221. Also, in this case, the columnar-shaped rubber material constituting the push member 226 returns to a columnar shape whereby the tip end of the convex-shaped leaf spring 225 is put in a state of projecting toward the slider 223, so that the tip end of the convex-shaped leaf spring 225 comes to a state, in which it gets below the rounded side end 223d of the slider 223. Thereby, in a state, in which the stand member 230 is contracted to a maximum relative to the holding member 220 in the vertical direction, upward movement of the stand member 230 is restricted by the first stopper 221e and downward movement of the stand member 230 is restricted by the tip end of the convex-shaped leaf spring 225. As a result, it is possible to prevent the stand member 230 from coming off from the holding member 220 when the stand member 230 is contracted.

Next, a state will be considered, in which the stand member 230 is extended downward, as shown in FIG. 22, to some extent relative to the holding member 220 from a state shown in FIG. 21.

In this state, the upper end surface 223a and the lower end surface 223b of the slider 223 do not abut against the first stopper 221e and the second stopper 221f of the recess 221a of the lower cover 221. In this case, since the dead weight of the liquid crystal television 250 (see FIG. 20) is applied on the lower cover 221, a force tending to move the lower cover 221 downward relative to the slider 223 acts. Therefore, a force tending to move the slider 223 upward relative to the lower cover 221 acts. And, in the embodiment, a movement restricting force generated by a push force of the convex-shaped leaf spring 225, which abuts against the side center portion 223c of the slider 223, is larger than the force tending to move the slider 223 upward. That is, since the columnar-shaped rubber material constituting the push member 226 is deformed elastically in this state to be made elliptical in shape, a force, by which the rubber material is going to return elastically to the columnar shape, acts as a push force of the convex-shaped leaf spring 225. Therefore, the slider 223 is restricted in moving due to the dead weight of the liquid crystal television 250.

In adjusting an inclination of the liquid crystal television 250, a larger force than a movement restricting force generated by the convex-shaped leaf spring 225 is applied to the stand member 230 when the stand member 230 should be extended or contracted relative to the holding member 220. Thereby, the slider 223 connected to the two tip ends 230b of the stand member 230 is moved in a direction substantially in parallel to a direction, in which the stand member 230 is extended or contracted. In this case, since the side center portion 223c of the slider 223 that abuts against the convex-shaped leaf spring 225 is formed to be substantially flat, the side center portion 223c and the convex-shaped leaf spring 225 abut against each other in the same state while the slider 223 is moved in a range, in which the side center portion 223c and the convex-shaped leaf spring 225 abut against each other. Therefore, while the slider 223 is moved in a range, in which the side center portion 223c and the convex-shaped leaf spring 225 abut against each other, a push force of the convex-shaped leaf spring 225 against the side center portion 223c is maintained substantially constant. Also, since the side center portions 223 of the slider 223 is substantially flat, it is free of any step. Therefore, the slider 223 is moved continuously in a stepless manner.

Next, a state will be considered, in which the stand member 230 is extended downward, as shown in FIG. 23, to a maximum relative to the holding member 220 from a state shown in FIG. 22. In this state, the lower end surface 223b of the slider 223 connected to the two tip ends 230b of the stand member 230 abuts against the second stopper 221f of the lower cover 221. Also, in this state, the columnar-shaped rubber material constituting the push member 226 is returned to the columnar shape whereby the tip end of the convex-shaped leaf spring 225 is put in a state of projecting toward the slider 223, so that the tip end of the convex-shaped leaf spring 225 comes to a state, in which it gets above the rounded side end 223d of the slider 223. Thereby, in a state, in which the stand member 230 is extended downward to a maximum relative to the holding member 220, downward movement of the slider 223 is restricted by the second stopper 221f and upward movement of the slider 223 is restricted by the tip end of the convex-shaped leaf spring 225. As a result, it is possible to prevent the stand member 230 from coming off from the holding member 220 when the stand member 230 is extended.

According to the embodiment, by making the side center portion 223c of the slider 223 substantially flat and stepless, and providing the convex-shaped leaf spring 225, which abuts against the flat and stepless side center portion 223c with a predetermined push force and restricts movements of the slider 223 caused at a force equal to or less than a predetermined moving force, and the push member 226, the stand member 230 mounted on the slider 223 can be prevented from moving due to the dead weight of the liquid crystal television 250, and when an angle of the stand member 230 is to be adjusted, the slider 223 can be moved continuously in a stepless manner while maintaining constant a push force of the convex-shaped leaf spring 225 against the substantially flat side center portions 223c of the slider 223. Thereby, the stand member 230 connected to the slider 223 can be extended or contracted continuously in a stepless manner in a range, in which the substantially flat side center portion 223c of the slider 223 abuts against the convex-shaped leaf spring 225. Thereby, a length of the stand member 230 can be adjusted steplessly relative to the holding member 220 in a range, in which the substantially flat side center portion 223c of the slider 223 abuts against the convex-shaped leaf spring 225, so that an inclination of the liquid crystal television 250 can be adjusted to an optional angle in a predetermined angular range.

According to the embodiment, an inclination of the liquid crystal television 250 can be adjusted by extending and contracting the stand member 230 as shown in FIG. 20, so that it is possible to adjust an inclination of the liquid crystal television 250 without shifting a position of the liquid crystal television 250 and a position of the support 230a of the stand member 230 relative to the rest surface. Thereby, a distance between a position, in which the liquid crystal television 250 rests, and a position, in which the stand member 230 rests, can be decreased as compared with the case where adjustment of an inclination of the liquid crystal television 250 is performed by adjusting an opening angle of the stand member 230 relative to the liquid crystal television 250, so that the installation space can be reduced correspondingly.

Also, since an inclination of the liquid crystal television 250 can be adjusted in a state, in which a position, in which the liquid crystal television 250 rests, and a position, in which the stand member 230 rests, are fixed, it is possible to reduce the possibility that the rest surface might be injured at the time of adjustment of an inclination of the liquid crystal television 250.

According to the embodiment, by turnably mounting the holding member 220 to the base member 210 mounted on the back surface of the liquid crystal television 250, the stand member 230 can be put in a state, in which it is closed on a side of the back surface of the liquid crystal television 250, at the time of conveyance and transportation. Thereby, it is possible to decrease a storage space at the time of conveyance and transportation.

In addition, it is to be considered that the embodiment disclosed herein is exemplary in all respects and not limitative. The scope of the invention is defined not in the explanation of the embodiment but in the claims and contains the meaning equivalent to the claims and all modifications in the claims.

For example, while the slider in the embodiment is formed to be rectangular in shape, the invention is not limited thereto but the slider may be formed to have another shape partially having substantially flat side center portions. For example, the slider may be formed to have a cylindrical shape partially having substantially flat side center portions.

While both the convex-shaped leaf spring and the push member are used as means for restricting movements of the slider in the embodiment, the invention is not limited thereto but only one of the leaf spring and the push member may be used as means for restricting movements of the slider.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A stand for a liquid crystal display comprising:
   a pipe-shaped stand member mounted on a back surface of the liquid crystal display configured to support the liquid crystal display in an inclined state, the pipe-shaped stand member including:
      a support portion extending horizontally relative to a rest surface of the liquid crystal display; and
      two tip ends extending in a direction intersecting with the rest surface;
   a holding member, to which the two tip ends of the stand member are mounted, the holding member including:
      a rectangular-shaped slider mounted to the two tip ends of the pipe-shaped stand member, the rectangular-shaped slider having:
         a side surface having substantially flat side center portion extending in a first direction substantially in parallel to a second direction, in which the two tip ends of the pipe-shaped stand member extend and both rounded side end recessed from the substantially flat side center portion of the side surface; and
         one end surface and the other end surface, which extend in a third direction substantially perpendicular to the second direction;
      a slider bearing member movably supporting the rectangular-shaped slider in the first direction, the slider bearing member having:
         a first stopper, against which the one end surface of the rectangular-shaped slider abuts; and
         a second stopper, against which the other end surface of the rectangular-shaped slider abuts, and
      a movement restricting member for restricting movement of the rectangular-shaped slider caused at a force equal to or less than a predetermined moving force having:
         a convex-shaped leaf spring mounted on the slider bearing member and arranged to abut against the substantially flat side center portion of the rectangular-shaped slider; and
         a push member made of a rubber material and pushing the convex-shaped leaf spring against the substantially flat side center portion of the rectangular-shaped slider with a predetermined pushing force; and
   a base member mounted on the back surface of the liquid crystal display and rotatably mounting the holding member.

2. A stand for a liquid crystal display comprising:
   a stand member mounted on a back surface of the liquid crystal display configured to support the liquid crystal display in an inclined state, the stand member including a support portion and a tip end;
   a holding member, including:
      a slider to which the tip end of the stand member is mounted and having a side surface having a substantially flat side center portion extending in a first direction substantially parallel to a second direction in which the tip end of the stand member extends and both side ends recessed from the substantially flat side center portion;
      a slider bearing member movably supporting the slider; and
      a movement restricting member mounted on the slider bearing member, for restricting movement of the slider caused at a force equal to or less than a predetermined moving force, and pushing against the substantially flat side center portion of the slider with a predetermined pushing force.

3. The stand for a liquid crystal display according to claim 2, wherein the slider further includes one end surface and the other end surface which extend in a direction substantially perpendicular to a direction in which the tip ends of the stand member extend,
   the slider bearing member movably supports the slider in a direction substantially parallel to the direction in which the tip end of the stand member extend, and
   the slider bearing member further includes a first stopper, against which the one end surface of the slider abuts and a second stopper, against which the other end surface of the slider abuts.

4. The stand for a liquid crystal display according to claim 2, wherein
   the holding member is rotatably mounted to a base member which is mounted on the back surface of the liquid crystal display.

5. The stand for a liquid crystal display according to claim 2, wherein the movement restricting member further includes:

a convex-shaped leaf spring, which is mounted on the slider bearing member and which is arranged to abut against the substantially flat side center portion of the slider; and a push member made of a rubber material and pushing the convex-shaped leaf spring against the substantially flat side center portion of the rectangular-shaped slider with a predetermined pushing force.

6. A stand for a liquid crystal display comprising:

a pipe-shaped stand member mounted on a back surface of the liquid crystal display configured to support the liquid crystal display in an inclined state, the pipe-shaped stand member including:
   a support portion extending horizontally relative to a rest surface of the liquid crystal display; and
   two tip ends extending in a direction intersecting with the rest surface;

a holding member, to which the two tip ends of the stand member are mounted, the holding member including:
   a slider mounted to the two tip ends of the pipe-shaped stand member;
   a slider bearing member movably supporting the rectangular-shaped slider in a direction substantially in parallel, in which the tip ends of the pipe-shaped stand member extend;
   a convex-shaped leaf spring mounted on the slider bearing member and arranged to abut a front surface of the convex-shaped leaf spring against a side surface of the rectangular-shaped slider;
   a push member pushing the convex-shaped leaf spring, and the push member including:
      a tapered portion which at least partially abuts against a back surface of the convex-shaped leaf spring; and
      a hole;
   a screw member fixedly inserted into the hole of the push member to move integrally with the push member, and adjusting a height of the tapered portion of the push member relative to the convex-shaped leaf spring;
   a push-force adjusting member adjusting a push force of the convex-shaped leaf spring on the side surface of the rectangular-shaped slider; and
   a base member mounted on the back surface of the liquid crystal display and rotatably mounting the holding member, wherein the slider bearing member has an adjustment hole, through which the screw member can be adjusted from outside.

7. A stand for a liquid crystal display comprising:

a stand member mounted on a back surface of the liquid crystal display configured to support the liquid crystal display in an inclined state, the stand member including a support portion and a tip end;

a holding member, to which the tip end of the stand member are mounted, the holding member including:
   a slider mounted to the tip end of the stand member;
   a slider bearing member that movably supports the slider;
   an abutment member provided on the slider bearing member and arranged to abut against a side surface of the slider; and
   a push-force adjusting member, for adjusting a push force of the abutment member relative to a side surface of the slider, provided on the slider bearing member and push the abutment member against the side surface of the slider.

8. The stand for liquid crystal display, according to claim 7, wherein the abutment member includes a convex-shaped leaf spring.

9. The stand for liquid crystal display according to claim 7, wherein the push-force adjusting member further includes:
   a push member for pushing the abutment member having a tapered portion, which at least partially abuts against the abutment member and a hole;
   a screw member fixedly inserted into the hole of the push member to move integrally with the push member, and adjusting a height of the tapered portion of the push member relative to the abutment member.

10. The stand for liquid crystal display according to claim 9, wherein the slider bearing member has an adjustment hole, through which the screw member can be adjusted from outside.

* * * * *